May 6, 1952     K. H. HANSEN ET AL     2,595,356
AUTOMATIC CONTROL FOR SWITCHING TYPE CONVEYERS
Filed Sept. 26, 1947
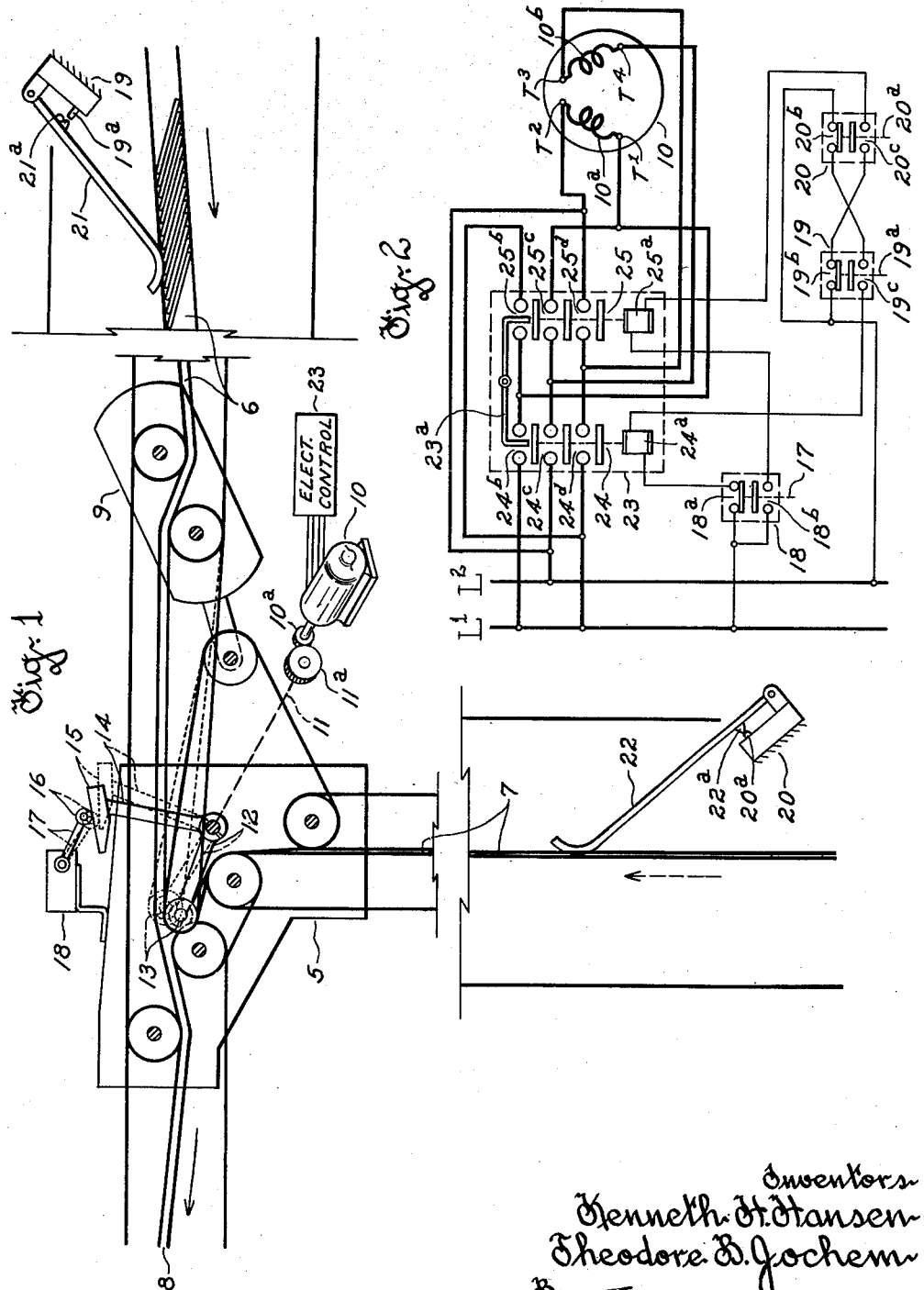

Patented May 6, 1952

2,595,356

UNITED STATES PATENT OFFICE 2,595,356

AUTOMATIC CONTROL FOR SWITCHING TYPE CONVEYERS

Kenneth H. Hansen, White Plains, N. Y., and Theodore B. Jochem, Wauwatosa, Wis., assignors to Cutler-Hammer, Inc., Milwaukee, Wis., a corporation of Delaware Application September 26, 1947, Serial No. 776,330

5 Claims. (Cl. 198—79)

1

This invention relates to power driven conveyors and more particularly to automatic control means for systems affording switching of materials from separate sources of supply to a common delivery point.

In the application of Warren H. Bacon and Kenneth H. Hansen, Serial No. 730,012, filed February 21, 1947, and assigned to the assignee of the instant application, there is disclosed an improved conveyor switch which provides for the transfer of a stream of papers from either of two separate conveyors, selectively, to a common conveyor. The present invention has among its objects to provide for such and other conveyor apparatus automatic control means which functions to effect appropriate positioning of the conveyor switch according to whichever of the two separate conveyors is active.

Another object is to effect through the aforementioned control means automatic starting and stopping of the power shifting means for said conveyor switch.

Another object is to provide control means of the aforementioned character which prevents shifting of the conveyor switch while papers are being supplied by either of said two separate conveyors to said common conveyor.

Other objects and advantages of the invention will hereinafter appear.

The accompanying drawings illustrate an embodiment of the invention which will now be described; it being understood that the embodiment illustrated is susceptible of various modifications without departing from the scope of the appended claims.

In the drawings:

Figure 1 is a more or less schematic showing in some detail of a conveyor switch, portions of the system adjacent thereto, and means affording control for the conveyor switch.

Fig. 2 is a diagrammatic showing of an automatic control system embodying the means for controlling the conveyor switch shown in Fig. 1.

Referring to Fig. 1, it shows a conveyor switch unit 5, two separate conveyors 6 and 7 which are individually adapted to convey streams of papers from separate press folders (not shown), to conveyor switch unit 5, and a common conveyor 8 which is adapted to transfer the streams of papers from the switch unit 5 to a delivery table (not shown). Conveyors 7 and 8 have end pulleys in switch unit 5. Conveyor 6 terminates at a section joint 9 adjacent to and at the right of switch unit 5; the arrangement of the conveyor switch and the conveyors associated therewith

2 being substantially the same as previously disclosed in the aforementioned application.

A reversible electric motor 10, shown schematically in Fig. 1 is provided for the shifting of an element of the switch unit 5 to one or the other of two extreme operating positions to effect a series relation between conveyors 6 and 8 or alternatively between conveyors 7 and 8. Motor 10, when energized, is adapted to rotate a shaft 11, carried by switch unit 5, in opposite directions to either of two extreme positions through the medium of a pinion 10$^a$ fixed on the motor shaft which drives a gear 11$^a$ fixed on shaft 11. As disclosed in the aforementioned application, rotation of the shaft 11 to said extreme positions effects appropriate positioning of a plurality of switch arms, such as the arm 12, which are fixed thereto adjacent one end of the latter and suitably spaced thereon across the width of the switch unit. Each of the arms is provided at its free end with a short shaft 13 on which a pair of free running pulleys are mounted. The last mentioned pulleys have individualized belts adapted to run thereon to effect a series relation between corresponding belts of conveyors 6 and 8 or conveyors 7 and 8 according to the positioning of the arms 12; one of said belts assuming an ineffective position while the other effects a series relation as aforementioned and vice versa.

In the present embodiment, shaft 11 is provided with another arm 14 rigidly fixed thereto adjacent one end of the latter at an angular relation to the arm 12. Arm 14 is provided with a cam 15 rigidly attached to its opposite end. Cam 15 is preferably provided with a flat cam surface which is adapted to engage with a roller follower 16 rotatably carried on one end of an operating arm 17 of a limit switch 18. The limit switch 18, which is of the "double-throw" type, is suitably mounted on switch unit 5 and is adapted to be moved to either of two operating positions through the movement of its operating arm 17 to corresponding operating positions.

The arm 14 is shown in full lines to correspond to the position assumed when the arm 12, also shown in full lines, is positioned in its extreme operating position to effect a series relation of one of the divertible belts aforementioned with the corresponding belts of the conveyor 6 and the conveyor 8. The arm 17 and cam 15 are likewise shown in full lines to depict the positions assumed when arm 14 is in the position last mentioned. Conversely, the arm 14 is shown in broken lines to correspond to the position assumed when the arm 12, also shown in broken lines, is in its other extreme operating position to effect a series relation of the other divertible belt aforementioned with the corresponding belts of the conveyor 7 and the conveyor 8. Arm 17 and cam 15 are likewise shown in broken lines to depict the positions assumed when the arm 14 is moved to the last mentioned position.

Respective portions of conveyors 6 and 7 are shown enlarged in Fig. 1 to depict their operative relation to switches 19 and 20, respectively, which are of the so-called "paper-break" type. The switches 19 and 20 are provided with actuating arms 21 and 22, respectively, each movable in a plane between adjacent conveyor belts of its respective conveyor. Arms 21 and 22 are provided with arcuate surfaces adjacent their free ends which are adapted to ride on streams of papers which may be carried by the conveyors in an imbricated relation, without snagging the papers.

Arm 21 of switch 19 is pivotally supported at its opposite end on the switch housing and is provided with a boss portion $21^a$ which is adapted to engage with a switch operating plunger $19^a$ that is normally biased to an extreme position outwardly with respect to the switch housing. Arm 21 is preferably biased by spring means (not shown) to a position such that the plunger $19^a$ is moved inwardly against its bias by the boss $21^a$. The arm 22 of switch 20 is likewise pivotally supported in the same manner and is provided with a boss $22^a$ which is adapted to engage with a switch operating plunger $20^a$ and to move it against its bias in the same manner as described for switch 19.

Switch 19 is depicted in the operating position assumed by it when a stream of papers is being carried by the conveyor with which it is associated, the arcuate surface of the arm 21 being shown as engaging with the papers being carried by the conveyor 6. The arm 21 then is in a position such that the plunger $19^a$ is moved by its bias to a position outwardly of the switch housing.

Switch 20, on the other hand, is depicted in the operating position assumed by it when there is no stream of papers being conveyed by the conveyor associated therewith. The operating arm 22 is shown in a position such that the plunger $20^a$ is moved inwardly against its bias with respect to the switch housing.

The electric circuit commutations effected by switches 19 and 20 in the operating positions aforementioned will be hereinafter described. Switches 19 and 20 may be respectively mounted relative to conveyors 6 and 7 anywhere between the press folders and conveyor switch unit 5 as preferred.

A reversing type of electrical controller 23 is represented by a rectangle in Figure 1, and as will be later apparent provides for the establishment of power circuits for the motor 10 for energization of the latter to run in opposite directions selectively in response to coaction of limit switch 18 and switches 19 and 20.

Referring to Figs. 2, it shows the wiring connections of controller 23, motor 10, limit switch 18 and switches 19 and 20 with respect to the power supply lines $L^1$ and $L^2$.

Controller 23 is shown as comprising a pair of mechanically interlocked electromagnetic contactors 24 and 25 which are adapted to be moved to circuit closing positions by their respective electromagnetic operating coils $24^a$ and $25^a$. The mechanical interlock, as represented by the double ended lever $23^a$, prevents operation of contactor 25 when contactor 24 is closed and vice versa.

Contactor 24 is provided with three sets of normally open contacts $24^b$, $24^c$ and $24^d$. Contactor 25 is likewise provided with three sets of normally open contacts $25^b$, $25^c$ and $25^d$.

Limit switch 18 is provided with a set of contacts $18^a$ which are adapted to be closed when its operating arm 17 is moved to one extreme position. It is also provided with another set of contacts $18^b$ which are adapted to close when its operating arm 17 is moved to the opposite extreme position.

Switch 19 is provided with a pair of contacts $19^b$ which are adapted to be closed when plunger $19^a$ is moved inwardly against its bias as aforementioned. It is also provided with a set of contacts $19^c$ which are adapted to be closed when the operating plunger $19^a$ moves outwardly of the switch housing under its bias. Switch 20 is provided with a set of contacts $20^b$ which are adapted to be closed when plunger $20^a$ is moved inwardly with respect to the switch housing against its bias. Switch 20 is also provided with a set of contacts $20^c$ which are adapted to be closed when the plunger $20^a$ moves outwardly with respect to the switch housing under its bias.

Motor 10 is shown as having a main stator winding $10^a$ with end terminals $T^1$ and $T^2$, and also is shown as having an auxiliary stator winding $10^b$ with end terminals $T^3$ and $T^4$. It is assumed that motor 10 is of the so-called "split-phase" induction type of single phase A. C. motor. However, as will be apparent to those skilled in the art the control herein set forth may be readily adapted to other types of single phase motors, direct current motors or even multi-phase A. C. motors.

Figs. 1 and 2 considered together will afford an understanding of the operation of the automatic control means.

As shown in Fig. 2, contactors 24 and 25, limit switch 18, and switches 19 and 20 are in the respective positions assumed after the arm 12 of conveyor switch unit 5 has been positioned as shown in broken lines in Fig. 1. In this position a stream of papers conveyed by the conveyor 7 will be transferred to conveyor 8 whenever the former is active.

However, switch unit 5 may be repositioned automatically to its other operating position when papers are thereafter conveyed by conveyor 6, assuming that conveyor 7 is no longer active, as follows:

When a paper stream carried by conveyor 6 moves past the switch 19, its operating arm 21 is lifted upwardly and the plunger $19^a$ is then permitted to move outwardly of the switch housing under its own bias to effect closing of the contacts $19^c$ and opening of contacts $19^b$; switch 19 remaining in this operating position so long as papers are being conveyed by the conveyor 6. Positioning of the switch 19 as last mentioned establishes a circuit from supply line $L^1$, through contacts $18^a$ of limit switch 18, through coil $24^a$ of switch 24, through contacts $19^c$ of switch 19 and through contacts $20^b$ of switch 20 to the supply line $L^2$. This effects energization of operating coil $24^a$ of contactor 24 which in turn closes contacts $24^b$, $24^c$ and $24^d$ of the latter. Thereupon, a power circuit is established from line $L^1$, through contacts $24^b$ to terminal $T^1$ of motor 10, through winding $10^a$, terminal $T^2$ to line $L^2$. A second power circuit is also established from line L¹, through contacts 24ᵈ to terminal T³ of motor 10, through winding 10ᵇ, terminal T⁴ and contacts 24ᶜ to line L². Motor 10 is thus energized to run in a direction to provide for movement of the arm 12 of switch unit 5 towards the position depicted in full lines in Fig. 1. Arm 12 is prevented from being moved beyond this position by the operation of the limit switch 18 through the medium of movement of its operating arm 17 to the position depicted in full lines by the roller follower 16 and the cam 14 as aforedescribed. When the operating arm 17 of limit switch 18 is moved to the last mentioned position, the contacts 18ᵃ open, thus opening the circuit to the operating coil 24ᵃ of contactor 24 which causes the contacts 24ᵇ, 24ᶜ, 24ᵈ to open thereby stopping the motor 10.

In the operating position of conveyor switch unit 5 thus attained, papers will be transferred to conveyor 8 whenever the same are being conveyed by the conveyor 6. Even though the switch 20 is purposely or accidentally moved to the operating position depicted for switch 19 in Fig. 1, it will be impossible to effect repositioning of the arm 12 of switch unit 5. If switch 20 were so operated while papers were being conveyed by the conveyor 6 the contacts 20ᶜ would close and contacts 20ᵇ would open. But it would not be possible to establish a circuit from line L¹ through operating coil 25ᵃ of contactor 25 to L² as the contacts 19ᵇ of switch 19 would be open whenever papers are being conveyed by the conveyor 6. It is necessary that switch 19 be returned to the normal position depicted for the switch 20 in Fig. 1 before it would be possible to effect a change in operating position of the switch unit 5 through the operation of the switch 20.

When conveyor 6 is no longer active and conveyor 7 subsequently becomes active again, switch unit 5 will be automatically repositioned back to the operating position depicted in broken lines, as follows:

A stream of papers carried by conveyor 7 will move switch 20 to the operating position depicted for switch 19 in Fig. 1. The contacts 20ᵇ will open and the contacts 20ᶜ will close. Switch 19 will have previously returned to the operating position depicted for switch 20 in Fig. 1 assuming all papers to have been removed from conveyor 6. Therefore contacts 19ᵇ will be closed and contacts 19ᶜ will be open while limit switch 18 will have been positioned as aforedescribed so that contacts 18ᵃ will be open and contacts 18ᵇ will be closed. Thus, a circuit will be established from line L¹, through contacts 18ᵇ of limit switch 18, through operating coil 25ᵃ of contactor 25, through contacts 20ᶜ of switch 20 and through contacts 19ᵇ of switch 19 to line L². This effects energization of operating coil 25ᵃ of contactor 25 and contacts 25ᵇ, 25ᶜ and 25ᵈ will then close.

Closing of contacts 25ᵇ, 25ᶜ and 25ᵈ thereupon energizes the motor 10 to run in an opposite direction from that aforementioned. The power connections of winding 10ᵃ being the same as previously described and the power connection of the winding 10ᵇ being reversed from that previously described.

When the arm 12 reaches the opposite extreme position, depicted in broken lines in Fig. 1, limit switch 18 operates, thereby opening contacts 18ᵇ and closing contacts 18ᵃ. Operating coil 25ᵃ is thereby de-energized and contacts 25ᵇ, 25ᶜ and 25ᵈ open and the motor 10 is stopped.

It will not be possible to effect repositioning of switch unit 5 again until switches 19 and 20 are moved to relatively reverse positions from those last mentioned. This will only obtain when conveyor 7 subsequently becomes inactive and conveyor 6 becomes active again.

What we claim as new and desire to secure by Letters Patent is:

1. The combination with conveyor apparatus including a switch adjustable to convey to a given point materials delivered from either of two sources, of a reversible electric motor for adjusting said conveyor switch, a power supply for said motor, and control means for said motor responsive to supply of material from either of said sources to connect said motor to said power supply for operation in opposite directions selectively for appropriate positioning of said conveyor switch if not occupying a position appropriate to the source of material, said control means having interconnected contact devices individualized to said sources and so interconnected that the active device retains control of said conveyor switch until rendered inactive by its respective supply of material.

2. The combination with conveyor apparatus including a switch adjustable to convey to a given point materials delivered from either of two sources, of a reversible electric motor for adjusting said conveyor switch, a power supply for said motor, and control means for said motor responsive to supply of material from either of said sources to connect said motor to said power supply for operation in opposite directions selectively for appropriate positioning of said conveyor switch if not occupying a position appropriate to the source of material, said control means comprising interconnected switches individualized to the sources supplying said conveyor apparatus and being sensitive to action and inaction of the respective sources but being so interconnected that any one of the same in action is free from interference by another, and said control means further comprising a double throw limit switch operatively associated with said conveyor switch and coacting with the first mentioned switches.

3. The combination with conveyor apparatus including a switch adjustable to convey to a given point materials delivered from either of two sources, of a reversible electric motor for adjusting said conveyor switch, a power supply for said motor, and control means for said motor responsive to supply of material from either of said sources to connect said motor to said power supply for operation in opposite directions selectively for appropriate positioning of said conveyor switch if not occupying a position appropriate to the source of material, said control means comprising a double throw limit switch operatively associated with said conveyor switch and also comprising interconnected switches individualized to the sources supplying said conveyor apparatus and being sensitive to action and inaction of the respective sources, the latter switches being coactive with said limit switch to effect operation of said motor in opposite directions selectively and their interconnections rendering operation of said motor dependent upon relatively reverse settings of said switches.

4. The combination with conveyor apparatus including a switch adjustable to convey to a given point materials delivered from either of two sources, of a reversible electric motor for adjusting said conveyor switch, a supply of power, electromagnetic switches for connecting said motor to said power supply for operation of said motor in opposite directions selectively, a double throw limit switch operatively associated with said conveyor switch to assume different positions selectively according to the position of said conveyor switch, and electrically interconnected switches individualized to the sources of supply of said conveyor apparatus, the switches last mentioned being sensitive to action and inaction of the respective sources and being coactive with said limit switch to effect energization of one or the other of said electromagnetic switches for operation and appropriate positioning of said conveyor switch by said motor if said conveyor switch does not occupy an appropriate position, the electrical interconnections of said individualized switches rendering each when effecting a given setting of said conveyor switch effective to maintain such setting while demanded by its respective supply of material.

5. The combination with conveyor apparatus including a switch adjustable to convey to a given point materials delivered from either of two sources, of a reversible electric motor for adjusting said conveyor switch, a supply of power, electromagnetic switches for connecting said motor to said source for operation of said motor in opposite directions selectively, a double throw limit switch operatively associated with said conveyor switch to assume different positions selectively according to the position of said conveyor switch, and electrically interconnected switches individualized to the sources of supply of said conveyor apparatus, the switches last mentioned being sensitive to action and inaction of the respective sources and being coactive with said limit switch to effect energization of one or the other of said electromagnetic switches for operation and appropriate positioning of said conveyor switch by said motor if said conveyor switch does not occupy an appropriate position, energization of either of said electromagnetic switches requiring by virtue of the interconnections of said individualized switches relatively reverse settings of the latter switches.

KENNETH H. HANSEN.
THEODORE B. JOCHEM.

REFERENCES CITED

The following references are of record in the file of this patent:

UNITED STATES PATENTS

| Number | Name | Date |
|---|---|---|
| 1,100,262 | Seaman | June 16, 1914 |
| 1,998,065 | Anderson | Apr. 16, 1935 |
| 2,304,447 | Feusier | Dec. 8, 1942 |